Jan. 28, 1947.    H. T. HERBST    2,414,873
MULTIFLAME WELDING APPARATUS
Filed Aug. 2, 1940
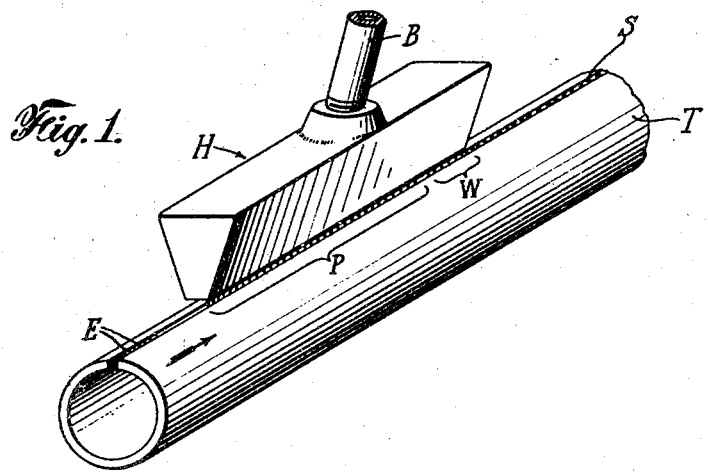
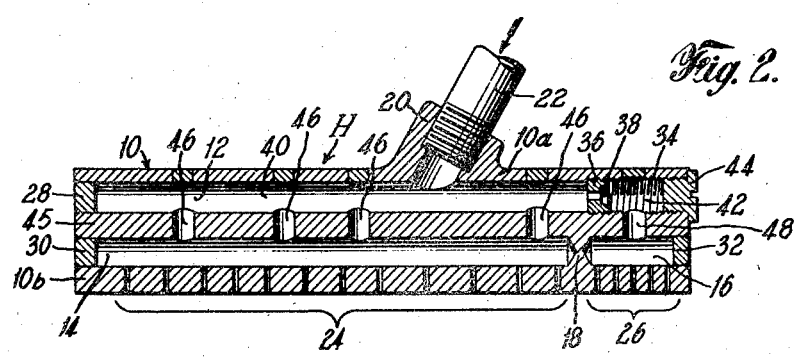
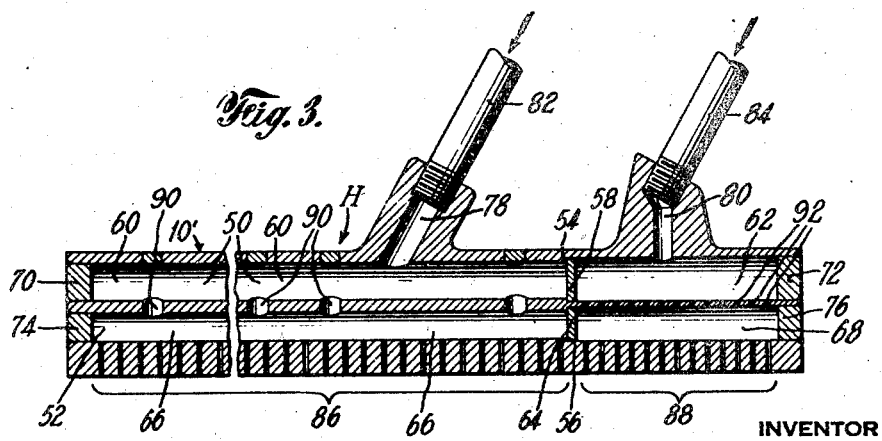
INVENTOR
HARRY T. HERBST
BY
ATTORNEY Patented Jan. 28, 1947

2,414,873

UNITED STATES PATENT OFFICE 2,414,873

MULTIFLAME WELDING APPARATUS

Harry T. Herbst, Elizabeth, N. J., assignor to Union Carbide and Carbon Corporation, a corporation of New York Application August 2, 1940, Serial No. 349,393

7 Claims. (Cl. 158—27.4)

This invention relates to welding apparatus and more particularly to an improved multi-flame welding head for pipe and tube welding.

In the art of pipe welding, metal skelp of the required dimensions is heated in a furnace until it is sufficiently hot to become pliable. The heated skelp is then gripped with a pair of tongs, and the tongs and the skelp are drawn through a forming bell or between shaping rolls. In this operation, the heated skelp is formed into a tubular shape and its opposite longitudinal edges are brought together. Simultaneously with the pipe forming operation, the longitudinal edges of the skelp are weld united to complete the pipe.

In tube welding, the skelp is formed, while cold, into a tubular shape in a separate operation. The longitudinal edges of the formed skelp are later weld united to complete the tubing.

In both pipe and tube welding, when the welding is done by the oxy-fuel gas process, a series of preheating flames or jets are directed upon at least the longitudinal edges of the skelp, and are followed by a series of welding flames or jets which weld unite the skelp edges as the skelp enters the closing die or closing pressure rolls. The preferred type of welding flame is a low velocity, i. e., 250'–300' per second neutral flame supplied with substantially equal volumes of oxygen and fuel gas. For various reasons, both series of flames or jets are usually provided by one welding head supplied with a gaseous heating mixture from a single blowpipe. Consequently, the type of preheating flame heretofore used has also been a low velocity neutral flame. This type of flame, however, when employed to preheat the work, is unstable and requires much auxiliary apparatus, such as air jets, to improve its stability and effect a more uniform heating. As the rate of heat transfer of this type of preheating flame is low, the speed of the operation is consequently decreased to a substantial extent.

It is therefore an object of this invention to provide apparatus wherein both the speed and efficiency of the welding operation are substantially increased without impairing the uniformity and quality of the finished weld. Other objects are to provide a unitary multi-flame welding head formed with means for producing one or more high velocity flames or jets and one or more low velocity flames or jets; to provide such a welding head in which both sets of flames or jets are supplied with a gaseous heating mixture from a single blowpipe; to provide pipe and tube welding means in which the necessity for auxiliary flame stabilizing means is eliminated; and to provide a unitary multi-flame welding head which is simple in construction and efficient in operation.

These and other objects of the invention will in part be obvious and in part become apparent from the following description and the accompanying drawing, in which:

Fig. 1 is a diagrammatic view illustrating the principles of the method of the invention; and Figs. 2 and 3 are longitudinal sectional views of two types of multi-flame welding heads embodying the invention and adapted to perform the welding method of the invention.

Generally speaking, in practicing the method of the invention, the work is progressively preheated by a series of relatively high velocity preheating flames or jets directed upon the work. The welding is accomplished by directing a series of relatively low velocity welding flames or jets on the skelp edges just before the skelp enters the closing die or closing pressure rolls. Both series of jets are preferably provided by a single unitary welding head.

In one type of welding head embodying the invention, the gaseous heating mixture for both the preheating and welding flames or jets is provided from a single blowpipe connected to a unitary multi-flame welding head. Means are provided in the welding head to reduce the pressure, and hence the velocity, of the gaseous heating mixture provided for the welding flames or jets. In another type of welding head embodying the invention, each series of jets is provided with a gaseous heating mixture from a separate blowpipe and both blowpipes are connected to a single unitary multi-flame welding head.

Referring more particularly to the drawing, Fig. 1 illustrates the invention as applied to pipe and tube welding, in which a multi-flame welding head H is shown as arranged in operative relation to the work, such as formed skelp T. The skelp T moves in the direction of the arrow, and as the skelp edges E pass beneath head H, the latter successively directs a series of high velocity preheating flames P and a series of low velocity welding flames W upon the skelp edges. Immediately after the formed skelp passes beneath the welding flames W, it passes through the closing die or closing pressure rolls (not shown) wherein the melted skelp edges E are forced together to form a fusion welded seam S.

The high velocity preheating flames rapidly heat the skelp edges to a high temperature, and the low velocity welding flames complete the fusion of the edges, whereby the edges may be forced together to form the seam S.

Both the preheating and the welding flames are supplied with a combustible mixture from a suitable mixing device, such as a blowpipe B, secured to the head H. It will be noted that both sets of flames are directed on the work from the single heating head H in a manner described more fully hereinafter.

The unitary multi-flame welding head illustrated in Fig. 2 comprises a shell 10 drilled longitudinally to form a gas inlet chamber 12 and aligned gas outlet chambers 14 and 16 which are separated by an integral partition or baffle 18. The upper wall 10a of shell 10 is formed with a threaded inlet portion 20 for connection with a blowpipe 22 or equivalent gas mixing device. The bottom thicker wall 10b of shell 10 is formed with a longitudinally disposed series of parallel preheating gas discharge ports or orifices 24, communicating with chamber 14, and a series of parallel welding gas discharge ports or orifices 26, communicating with chamber 16. A plug 28 permanently closes one end of chamber 12, and plugs 30 and 32 permanently close the outer ends of chambers 14 and 16, respectively.

One end of chamber 12 is enlarged and threaded, as at 34, and pressure reducing means, such as an apertured threaded plug, or restricting orifice, 36 is secured in the threaded portion of the chamber 12. The pressure reducing means 36, which is formed with a kerf or socket 38 to permit its ready removal, divides the chamber 12 into high pressure and low pressure sections 40 and 42, respectively. The outer end of section 42 is closed by a threaded plug 44. Cross drillings 46 and 48, through the wall 45 which separates chamber 12 from chambers 14 and 16, provide communication between section 40 and chamber 14 and between section 42 and chamber 16, respectively. To distribute the gas uniformly to the groups of outlets, the drilling 48 is located about centrally relatively to the orifices 26 and the drillings 46 are suitably spaced apart.

The gaseous heating mixture from the gas mixing means or blowpipe 22, enters the high pressure section 40 of chamber 12 through the inlet portion 20. From section 40, the gaseous heating mixture, which is under relatively high pressure, passes into chamber 14 through drillings 46, and is discharged from the preheating ports or orifices 24 at a relatively high velocity.

Because of the relatively high pressure existing in section 40 of chamber 12, some of the gaseous heating mixture will pass through the pressure reducing means 36 into the section 42 of the inlet chamber 12. This mixture will pass through the drilling 48 into outlet chamber 16 from which it will be discharged through the welding flame ports or discharge orifices 26. Because of its passage through the restricting orifice 36, the velocity of the gaseous heating mixture discharged from ports 26 will be much lower than the velocity of the preheating flames. The proper ratio of the two velocities may be obtained by varying the size of the pressure reducing orifice 36, as by removing the one shown and substituting one of a different size. If desired, the shell 10 may be water-cooled to prevent overheating.

It will be noted that in this embodiment of the invention, a series of high velocity preheating flames or jets and a series of low velocity welding flames or jets are supplied from a single unitary multi-flame welding head; and that the gaseous heating mixture for both series of flames and jets is provided from a single blowpipe or gas mixer.

In the welding head illustrated in Fig. 3, both series of flames or jets are again provided by a single unitary multi-flame welding head, but the gaseous heating mixture for each series of flames or jets is provided from a separate blowpipe or gas mixing device.

Referring more particularly to Fig. 3, the unitary multi-flame welding head comprises a shell 10' drilled longitudinally to form passages 50 and 52. The right hand end of passage 50, as viewed in the drawing, is counterbored, forming a shoulder 54, and the right hand end of passage 52 is similarly counterbored, forming a shoulder 56. A fixed baffle 58, secured against shoulder 54, divides passage 50 into a preheating gas inlet section 60 and a welding gas inlet section 62. Similarly, a fixed baffle 64 seated against shoulder 56, divides passage 52 into outlet chambers 66 and 68. The outer ends of sections 60 and 62 are closed by fixed plugs 70 and 72, respectively, and the outer ends of chambers 66 and 68 are closed by fixed plugs 74 and 76, respectively.

Threaded inlet portions 78 and 80 are formed in the upper wall of each chamber 60 and 62 for receiving the ends of blowpipes or gas mixing means 82 and 84, respectively. The lower wall of chamber 66 is formed with a series of preheating gas discharge ports or orifices 86, and the lower wall of chamber 68 is formed with a series of welding gas discharge ports or orifices 88. Lateral drillings 90 and 92 provide communication between chambers 60 and 66 and between chambers 62 and 68, respectively.

With this embodiment of the invention, the relative velocities of the preheat flames or jets and the welding flames or jets may be independently regulated by suitable adjustments of the blowpipes 82 and 84.

When the unitary multi-flame fusion welding head of the invention is employed for pipe and tube welding, as illustrated in Fig. 1, it is so disposed that the series of preheating and welding ports or discharge orifices are aligned longitudinally of the seam to be welded in a single file. After the heated skelp is formed into a tubular shape, its longitudinal edges are progressively brought beneath the welding head. The high velocity preheating flames P rapidly heat the skelp edges E to a welding temperature, and no stabilizing devices are necessary to satisfactorily preheat the adjacent skelp edges. The high rate of heat transfer of the preheating flames increases the speed and economy of the operation. As the preheated edges emerge from beneath the preheating flames, the low velocity welding flames P progressively melt the metal of the edges, and, as the formed skelp passes through the closing die or closing pressure rolls, a strong weld of uniform high quality is produced.

The combining of the preheating and welding apparatus in a single unitary welding head increases the simplicity of welding and results in a considerable economy of space without detracting from the quality of the weld.

It should be understood that the invention may be variously embodied otherwise than as shown and described without departing from the principles of the invention and within the scope of the appended claims.

Certain features of the present invention are claimed in application Serial No. 458,627, filed September 17, 1942, which is, in part, a continuation of the present application.

What is claimed is:

1. A unitary multi-flame welding head formed with an inlet chamber, a pair of outlet chambers, and gas discharge orifices communicating with each of said outlet chambers; pressure reducing means secured in said inlet chamber and dividing the same into two sections; and means establishing communication between each of such sections and an outlet chamber.

2. A unitary multi-flame welding head formed with an inlet chamber, a pair of outlet chambers, preheating gas discharge orifices communicating with one of said outlet chambers, and welding gas orifices communicating with the other of said outlet chambers; pressure reducing means dividing said inlet chamber into first and second sections; means for supplying a gaseous heating mixture to said first section; and means establishing communication between said first section and said one outlet chamber, and between said second section and said other outlet chamber, respectively.

3. Apparatus for progressively preheating and welding a seam while the work is in continuous movement in the direction of the seam, comprising a head having a series of relatively high velocity work preheating gas discharge ports and a series of relatively low velocity seam welding gas discharge ports, all of said ports being arranged for successively directing upon the edges of the work to be welded a series of high velocity preheat flames and a series of low velocity welding flames, separate longitudinally aligned welding and preheating gas outlet chambers and communicating longitudinally aligned welding and preheating gas inlet chamber sections, the longitudinal axis of said gas inlet chamber sections being parallel to that of said gas outlet chambers and the length of said welding gas chamber and section being less than that of said preheating chamber and section.

4. Apparatus for progressively preheating and welding a seam while the work is in continuous movement in the direction of the seam, comprising a head having a series of relatively high velocity work preheating gas discharge ports and a series of relatively low velocity seam welding gas discharge ports, all of said ports being arranged for successively directing upon the edges of the work to be welded a series of high velocity preheat flames and a series of low-velocity welding flames, a pair of separate longitudinally aligned welding and preheating gas outlet chambers and a pair of longitudinally aligned heating and preheating gas inlet chamber sections, the longitudinal axis of said gas inlet chamber sections being parallel to that of said gas outlet chambers, and the length of said welding gas chamber and section being less than that of said preheat gas chamber and section, one of said gas inlet chamber sections having a gas inlet, and a gas outlet communicating with the other gas inlet chamber section.

5. Apparatus for progressively preheating and welding a seam while the work is in continuous movement in the direction of the seam, comprising a multi-flame head comprising a shell having aligned high and low pressure gas outlet chambers separated by a partition; the bottom wall of said shell having a longitudinally disposed series of parallel high velocity work preheating gas discharge ports communicating with said high pressure gas outlet chamber, and a series of parallel low velocity seam welding gas discharge ports communicating with said low pressure gas outlet chamber; said shell having a high pressure preheating gas inlet chamber section and a low pressure welding gas inlet chamber section aligned with each other and disposed in parallel relation to and above said high and low pressure gas outlet chambers, respectively, and means for supplying preheating gas at high pressure and welding gas at low pressure, respectively, to said sections.

6. In the head of the apparatus defined in claim 3, separate gas mixers for supplying different gaseous heating mixtures to the gas inlet chamber sections.

7. Apparatus as defined by claim 5, including separate blowpipe means for supplying gases at different pressures to said gas inlet sections.

HARRY T. HERBST.